United States Patent [19]
Uchida et al.

[11] Patent Number: 5,081,644
[45] Date of Patent: Jan. 14, 1992

[54] SPREAD SPECTRUM RECEIVING DEVICE

[75] Inventors: Yoshitaka Uchida; Takeshi Hashimoto, both of Tokyo, Japan

[73] Assignee: Clarion Co., Ltd., Tokyo, Japan

[21] Appl. No.: 581,018

[22] Filed: Sep. 12, 1990

[30] Foreign Application Priority Data

Sep. 5, 1989 [JP] Japan .................... 1-230056
Sep. 8, 1989 [JP] Japan .................... 1-234239

[51] Int. Cl.⁵ ............................................ H04L 27/30
[52] U.S. Cl. ................................. 375/1; 375/87; 375/88; 375/91; 329/302; 329/306
[58] Field of Search .................... 375/1, 87, 88, 91; 380/34; 341/70; 329/302, 303, 306, 309, 310

[56] References Cited
U.S. PATENT DOCUMENTS

| | | | |
|---|---|---|---|
| 2,715,677 | 8/1955 | Turner | 375/91 |
| 2,882,338 | 4/1959 | Wozencraft | 375/91 X |
| 2,995,627 | 8/1961 | Lakatos | 375/91 X |
| 3,391,344 | 7/1968 | Goldberg | 375/1 X |
| 4,942,591 | 7/1990 | Nease et al. | 375/1 X |
| 5,025,452 | 6/1991 | Sohner et al. | 375/1 |

Primary Examiner—Bernarr E. Gregory
Attorney, Agent, or Firm—Wallenstein, Wagner & Hattis, Ltd.

[57] ABSTRACT

A spread spectrum communication (SSC) receiving device is disclosed, in which a received signal consisting of an SSC signal in the SSC signal band and disturbance wave is divided into an upper side band and a lower side band; electric powers of the signal in the upper side band and the signal in the lower side band are compared with each other; and the SSC signal in the upper side band or in the lower side band, where there exists no disturbance wave, is outputted according to the result of the comparison.

16 Claims, 13 Drawing Sheets

SPREAD SPECTRUM RECEIVING DEVICE

FIELD OF THE INVENTION

The present invention relates to an improvement of the spread spectrum receiving device.

BACKGROUND OF THE INVENTION

The spread spectrum communication (hereinbelow called SS communication) is a method, by which on the transmitter side, the primary modulation is effected by using a code called PN (pseudo-noise) code, which has a speed significantly higher than the information signal to be transmitted, and further the carrier wave is subjected to a secondary modulation (the order of the primary modulation and the secondary modulation can be reversed) to be transmitted, and on the receiver side, reverse spreading is effected by correlation detection between the PN code and the received information and the information signal is restored by synchronized detection, etc. thereof. In general, it is said that this method is strong against disturbance wave and selective fading. This reason will be explained below.

Figure 14A:
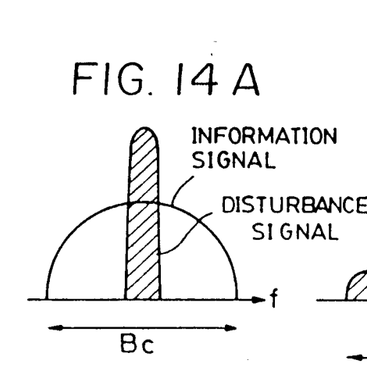
FIGS. 14(A) to 14(C), 15, 16(A) to 16(C), 17 and 18 show spread signal spectra under various conditions of interference.
Figure 14B:
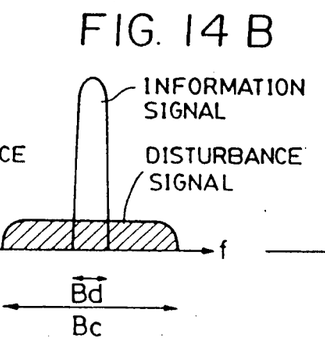
Figure 14C:
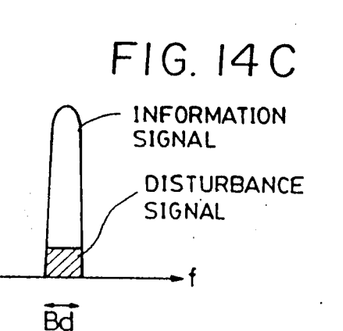

At first, on the characteristics against disturbance, in the case where narrow band disturbance wave is mixed in the received signal, as indicated in FIG. 14(A), in the signal spectrum obtained as the result of the correlation detection between this received signal and the PN code, the signal component is reversely spread into a bandwidth Bd and on the contrary the disturbance wave is spread into a bandwidth Bc, as indicated in FIG. 14(B). When this output signal is made to pass through a band pass filter having the bandwidth the, electric power of the disturbance wave is reduced to Bd/Bc, as indicated in FIG. 14(C) (this is called processing gain). That is, it can be said that the resistance against the disturbance wave is increased, corresponding to this processing gain. The disturbance wave becomes white-noise-like, i.e. non-understandable noise, by the correlation detection.

Figure 15:
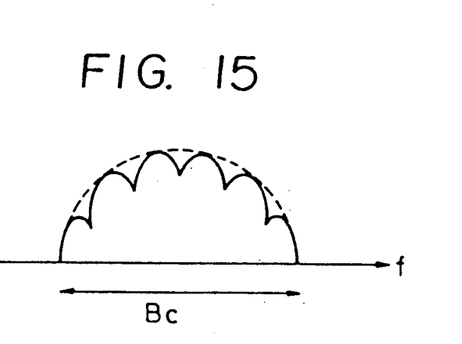

Next, on the characteristics against selective fading, in the case where the selective fading is produced by multipath interference, in the received signal, ripple is produced within the bandwidth Bc, as indicated in FIG. 15 and a part of the information of the signal is lost. However, since the information signal is spread so that a plurality of information signals are produced, information remains always in the whole and therefore, when it is reversely spread, the information signal can be restored. That is, it can be said that, contrarily to the narrow band communication, the resistance against the selective fading is obtained by spreading spectrum.

Figures 16A, 16B:
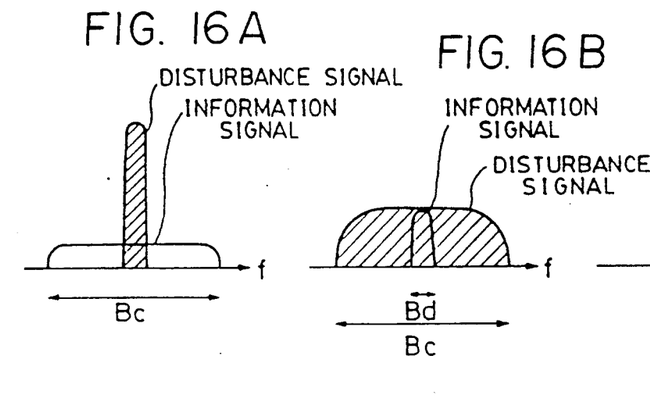
Figure 16C:
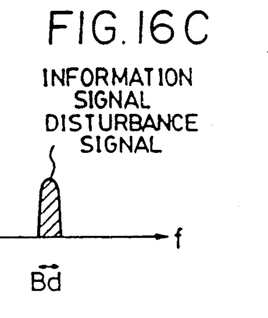

However, in the case where disturbance wave is mixed at a level exceeding the processing gain, as indicated in FIGS. 16(A), 16(B) and 16(C), the information signal is buried in noise also after the correlation detection and can be restored no more. The above description has been made under an assumption that the synchronization is established. In reality, with disturbance wave over a certain level below the processing gain the synchronization can not be established and thus information can be restored no more.

Figures 17, 18:
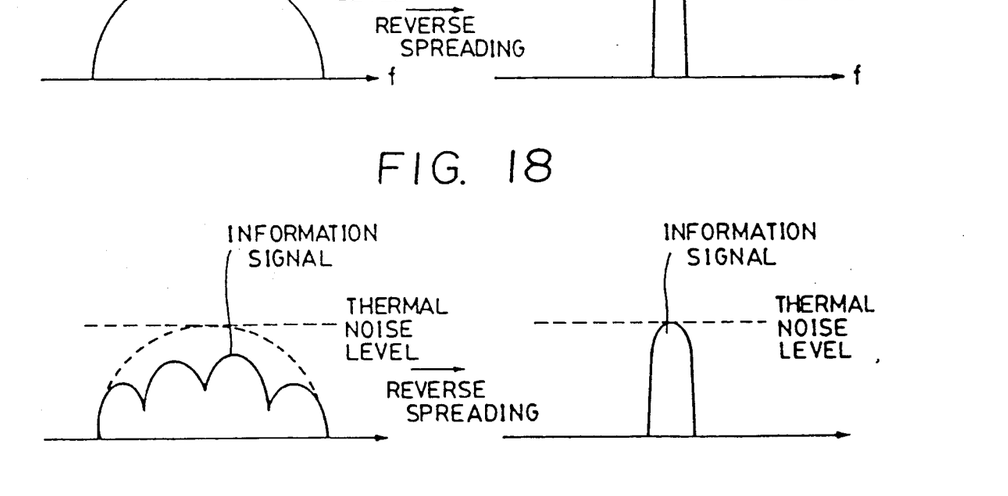

Further, depending on the interval (frequency) between ripples due to the selective fading, the depth (attenuation) and the level of the received signal (expressed by the ratio to thermal noise), even if the reverse spreading is effected by the correlation detection, the information signal is buried in the thermal noise and cannot be restored. That is, even if the spread information signal is below the level of the thermal noise under an environment, where there is no selective fading, as indicated in FIG. 17, the information signal can be restored by the reverse spreading. However, as indicated in FIG. 18, much information can be lost by a selective fading giving deep variations so that the information signal is buried in the thermal noise even by the reverse spreading and that it can be restored no more.

Consequently, by prior art methods, a method has been conceived in order to remove these drawbacks, by which similarly to the narrow band communication, the same information is transmitted, divided into a plurality of bands and a given band, on which influences of disturbance waves and selective fading are slight, is chosen.

Figure 6A:
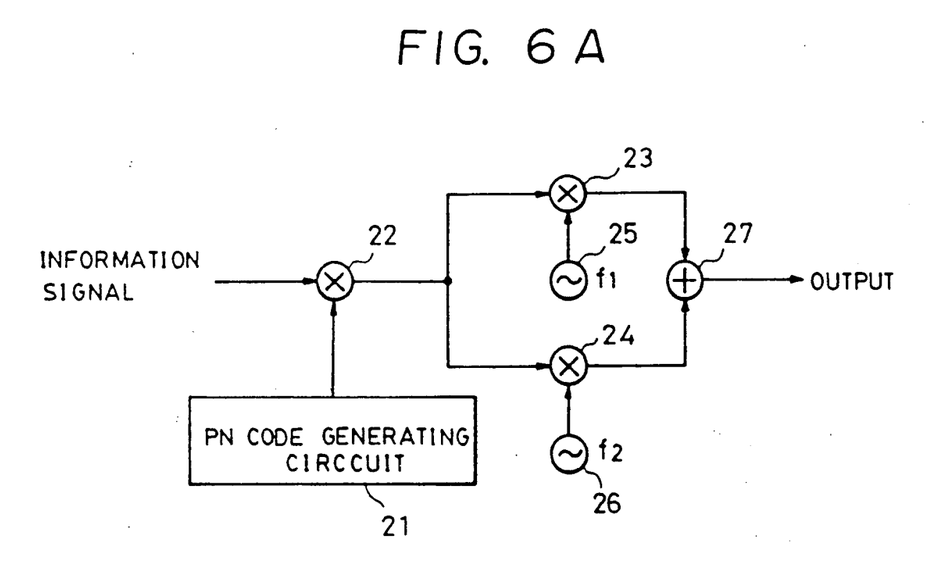
FIGS. 6A and 6B are schemes for explaining an example of two-wave transmission.
Figure 6B:
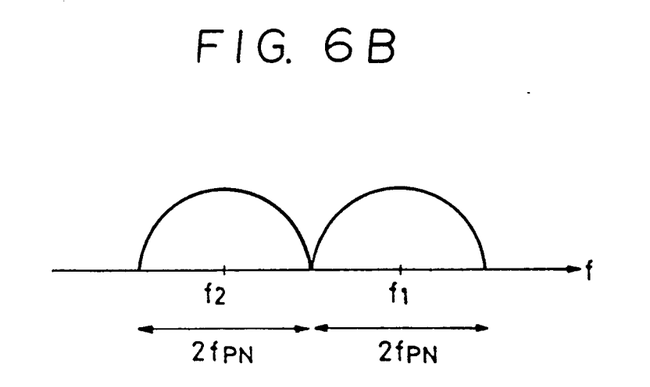

For example, a plural transmission method is known (FIG. 6A), by which a PN code generating circuit 21, multipliers 23 and 24, local oscillators 25 and 26, and an adder 27 are used. FIG. 6B shows the frequency spectrum of the output thereof.

However, by this prior art method a plurality of carriers, multipliers, etc. are required at the transmitter and therefore this method had drawback that no cheap receiving device can be constructed. Further, since the number of parts increases, this method has a problem in the attempt to reduce the size.

OBJECT OF THE INVENTION

Consequently the object of the present invention is to provide a cheap and simple receiving device, excellent in its characteristics against disturbance waves and in its characteristics against fading in the spread spectrum communication.

SUMMARY OF THE INVENTION

In order to achieve the above object, an SSC receiver according to the first of the present inventions is characterized in that it comprises means for separating a received signal into bands different from each other, comparing means for comparing electric powers of the signals in the different separated bands with each other and switching means for outputting selectively the separated signals described above, responding to the comparison stated above.

The electric power spectrum of the SSC signal is symmetric with respect to the carrier frequency ($f_0$) (upper side band and lower side band) and also base band information spread by using the pseudo noise code exists similarly both in the upper side band and in the lower side band. Consequently, since in the comparison of the energies, which have passed through respective band pass filters (hereinbelow abbreviated to BPF) the energy in the upper side band and that in the lower side band are equal to each other for the SSC signal, the detection of disturbance wave can be effected easily by the method, by which the energies are compared. The base band information is not lost, if only either one of the upper side band and the lower side band, which is not disturbed, is used according to the present inventions.

Further, although the energy of the SSC signal, which has passed through only one of the upper side band and the lower side band, is a half of the energy of the initial SSC signal (3 dB down), and since the phase in the SSC signal is maintained, there is no problem for the demodulation of the data.

A spread spectrum receiving device according to the second of the present inventions, which restores the information signal, whose spectrum is spread by using a Manchester-coded PN code, is characterized in that it comprises a filter separating a received signal into two channels having different passbands; means for comparing the levels of the signals separated by the filter with each other; and a switching means outputting selectively one of the two channels on the basis of the result of the comparison stated above.

A spread spectrum receiving device according to the third of the present inventions, which is similar to that described above, is characterized in that it comprises weighting means for setting the level of the received signal at a predetermined level; frequency converting means for shifting the frequency of the received signal at a predetermined frequency; a switch for selecting one of the received signal and the signal shifted in the frequency; a filter for extracting a predetermined passband of the signal selected by the switch stated above; and comparing means for comparing the level of the weighted signal described previously with the level of the signal obtained through the filter to turn over the switch stated above.

A spread spectrum receiving device according to the fourth of the present inventions, which is similar to those described above, is characterized in that it comprises a filter separating a received signal into two channels having different passbands; frequency converting means for shifting the frequencies of the separated signals at predetermined frequencies; and means for combining the signals thus shifted in the frequency.

DETAILED DESCRIPTION

Figure 1:
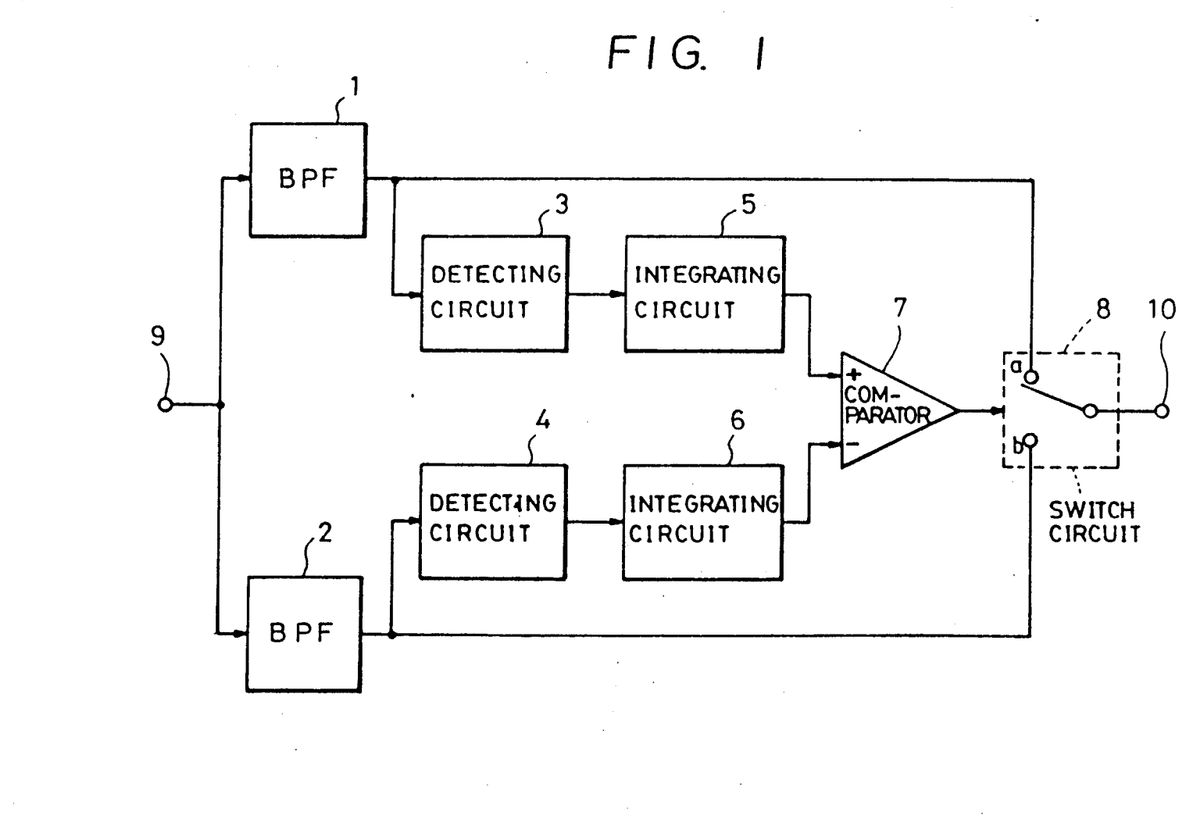
FIG. 1 is a block diagram showing a first embodiment of the present invention.

FIG. 1 is a block diagram showing the construction of an SSC receiver according to the present invention, in which reference numerals 1 and 2 are BPFs; 3 and 4 are detecting circuits; 5 and 6 are integrating circuits; 7 is a comparator; 8 is a switching circuit; 9 is a received signal; and 10 is an output signal.

Figure 2A:
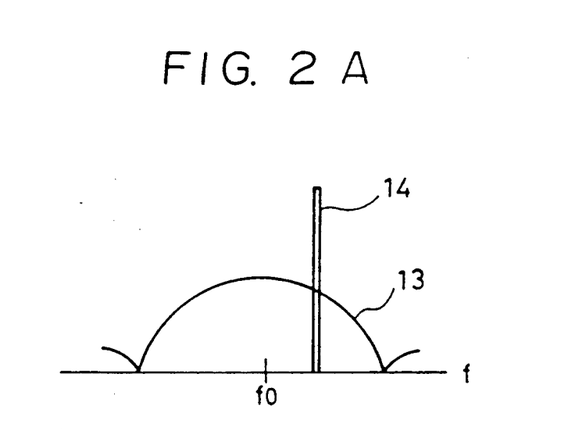
FIGS. 2(A) to 2(C) are schemes indicating the frequency distribution for explaining the operation thereof.

Hereinbelow the operation of the embodiment described above will be explained (refer to FIG. 2(A)).

A received signal, in which disturbance wave 14 is mixed in an SSC signal 13, is inputted in the filters 1 and 2.

Figure 2B:
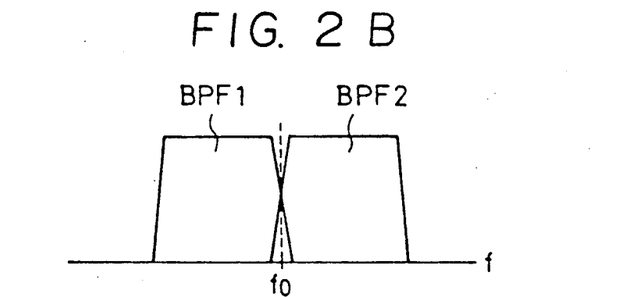

The passbands of the filters 1 and 2 have the characteristics indicated in FIG. 2(B).

The filter outputs of the filters 1 and 2 are detected by the detecting circuits 3 and 4, respectively. The detection outputs thereof are integrated by the integrating circuits 5 and 6, respectively, which are inputted to the comparator 7.

If a disturbance wave exists, the integrated voltage of the output e.g. of the integrating circuit 6 through the filter 2 is higher than the output of the integrating circuit 5. This is because the energy of the disturbance wave is added thereto.

In this way, the comparator 7 compares the outputs of the integrating circuits 5 and 6, with each other to output a signal.

This output of the comparator 7 acts as the control signal for controlling the switching circuit 8.

In this case, since the output of the integrating circuit 5 is smaller than the output of the integrating circuit 6, the comparator 7 outputs a signal of negative voltage.

Figure 2C:
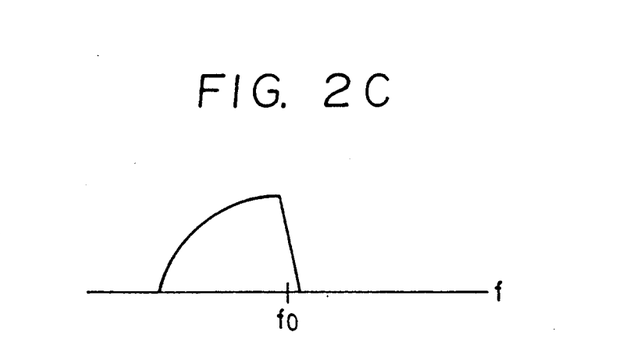

In this way, the switching circuit 8 is turned-on on the a side and outputs the SSC signal, which has passed through the filter 1, where no disturbance wave exists (refer to FIG. 2(C)).

Figure 3:
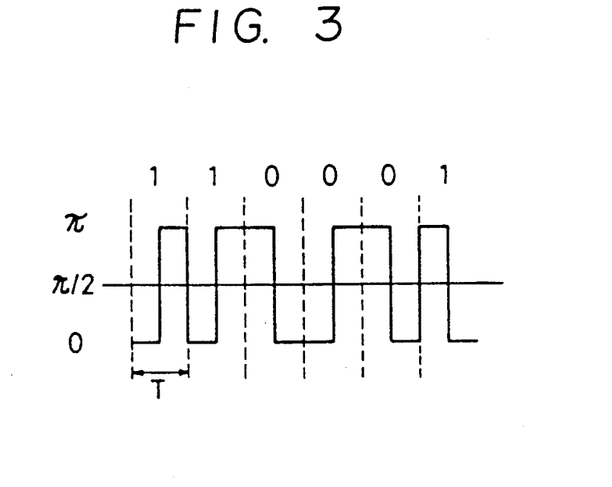
FIG. 3 is a scheme for explaining a method for Manchester-coding an information signal.
Figure 4:
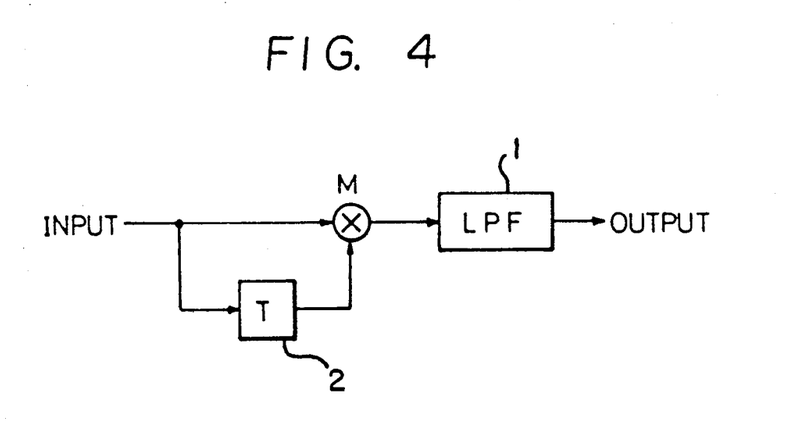
FIG. 4 is a scheme indicating a method for demodulating the Manchester-coded signal.

Now in general, there is known an anti-multipath-wave modulation method, by which an information signal is Manchester-coded. By this method, the information signal is restored by shifting the phase by $\pi$ at the center of 1 bit of the information signal, as indicated in FIG. 3, and by effecting one-bit delay detection, as indicated in FIG. 4. In FIG. 4, 1 represents a low pass filter, M a multiplier, and 2 a one-bit delay circuit. By this method, if the delay time difference is in a suitable region, even if e.g. two waves interfere with each other at a same level and an opposite phase, the eye of the information signal pattern is not closed. That is, an effect is obtained, which is equivalent to that a sort of multipath diversity reception is effected.

Figure 5A:
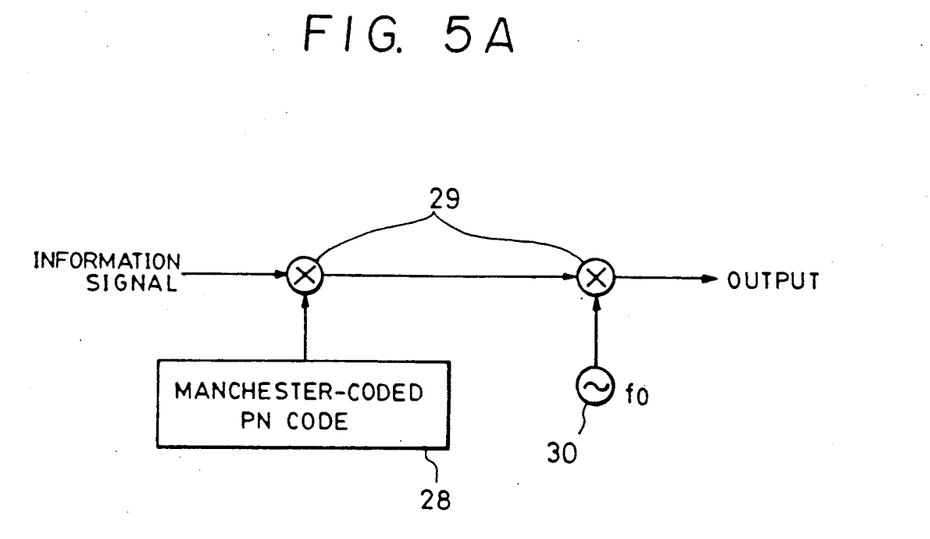
FIGS. 5A is a fundamental explanation scheme, in which the Manchester-coding method is used in an SSC transmitter.
Figure 5B:
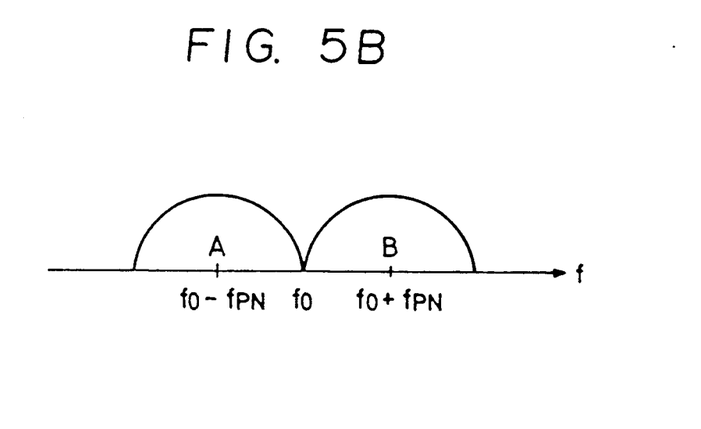
FIG. 5B shows a frequency spectrum thereof.
Figure 7:
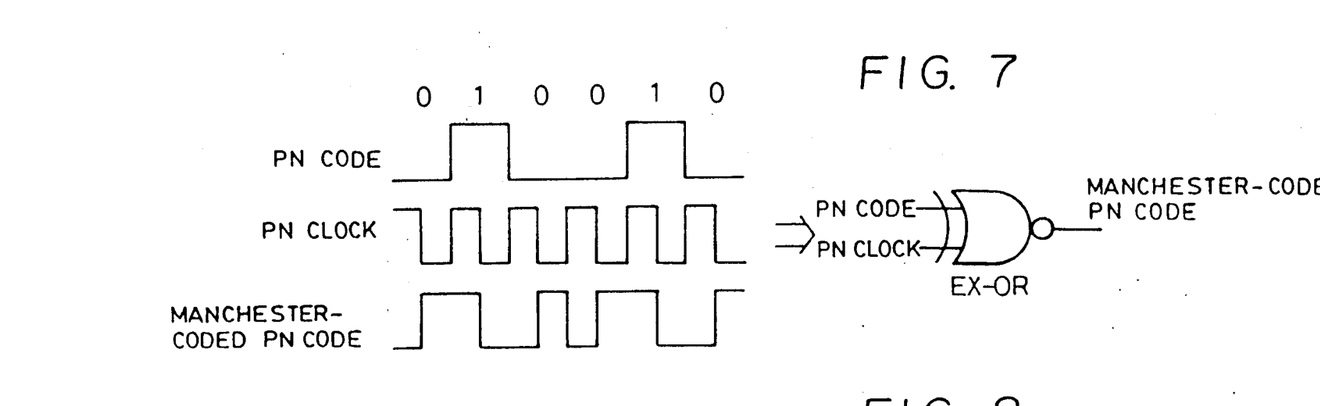
FIG. 7 is a scheme showing an example of the construction of a Manchester-coded PN code generating circuit and a scheme for explaining the operation thereof.

In SSC receivers according to the second to the fourth of the present inventions, the characteristics in the frequency region by the method described above are applied. That is, as indicated in FIG. 5A, the fact that a PN code is Manchester-coded by means of a Manchester-coded PN code generating circuit 28 has a property in the frequency region to be equivalent to the fact that same information is transmitted, divided into two parts, A and B (FIG. 5B). In FIG. 5A, 29 is a multiplier and 30 is a local oscillator. By using this property an effect can be obtained, which is similar to the example of two-wave transmission indicated in FIGS. 6A and 6B. In FIG. 6A, 22 to 24 are multipliers, 25 and 26 are oscillators and 21 is a PN code generator. An example of the construction of the Manchester-coded PN code generating circuit is indicated in FIG. 7, in which the PN code is Manchester-coded by forming an exclusive logic sum of the PN code and the PN clock by means of a logic circuit EX-OR and inverting the output thereof.

Figure 8:
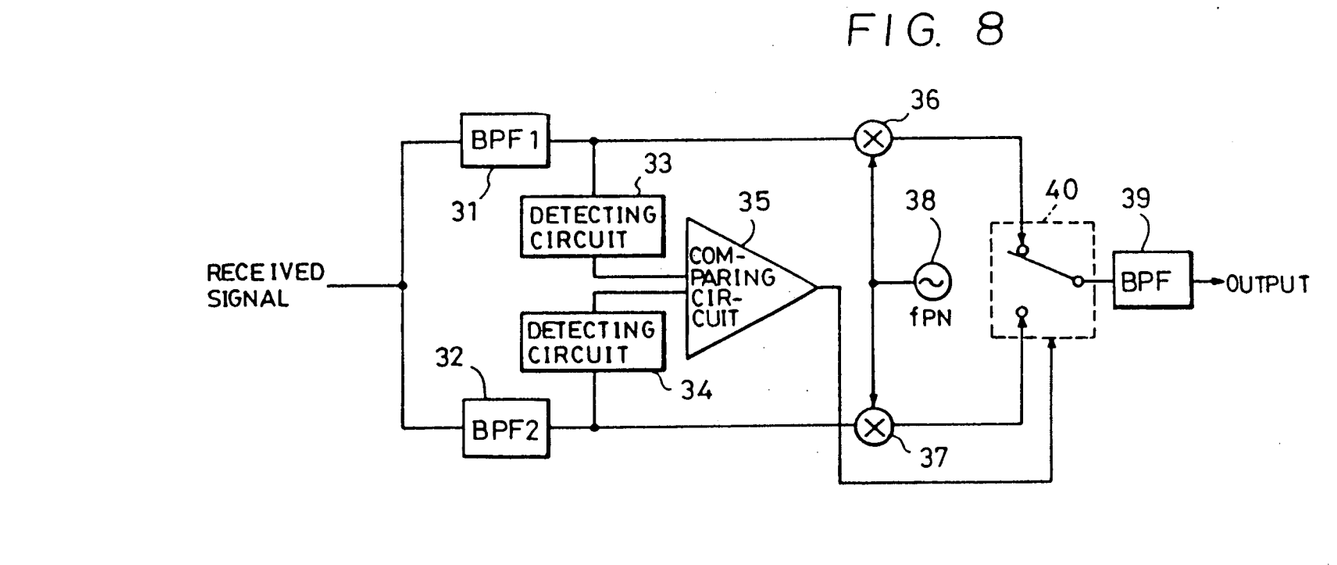
FIG. 8 is a block diagram showing a second embodiment of the present invention.

FIG. 8 shows a second embodiment of the SSC receiving device according to the present invention. In the figure, 31, 32 and 39 are band pass filters; 33 and 34 are detecting circuits; 35 is a comparing circuit; 36 and 37 are multipliers; 38 is a PN clock oscillator; and 40 is a selecting switch.

In the second embodiment, a received signal is divided into two channels by means of a filter 31, which makes A in FIG. 5B pass through, and a filter 32, which makes B pass through. The outputs thereof are given to the detecting circuits 33 and 34 and the multipliers 36 and 37, respectively. The detecting circuits 33 and 34 detect the respective filter outputs. The detection outputs are compared in level by the comparing circuit 35 and the selecting switch 40 selects the channel having the lower level in response to the output of the comparing circuit 35. In this way the fact that the band, where the disturbance wave exists has a higher energy of the received signal, when the disturbance wave is mixed, is utilized by limiting the band of the received signal by means of the filters 31 and 32 to divide it into two channels.

The filter output of the selected channel is subjected to a frequency shift by multiplying it by the PN clock by means of the multiplier 36 or 37 so that the same central frequency can be easily obtained for the two chosen one of the channels and pass through a final band pass filter 39.

Figure 9A:
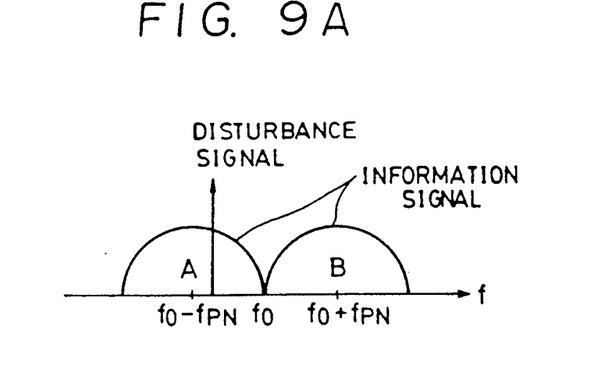
FIGS. 9A-9D show the signal spectrum at various points in FIG. 8.
Figure 9B:
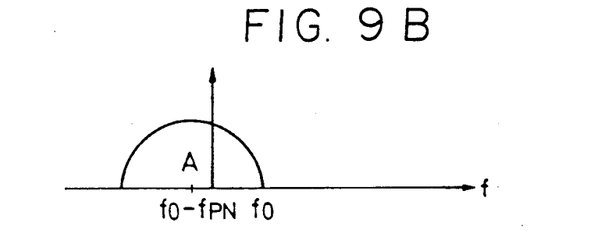
Figure 9C:
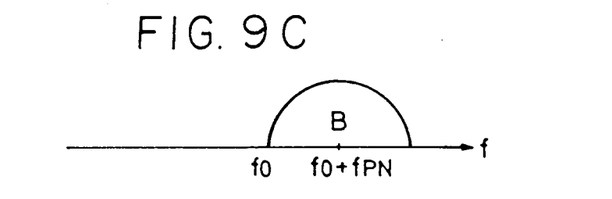
Figure 9D:
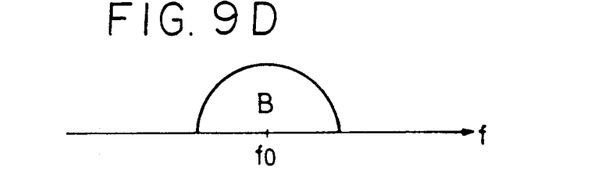

FIGS. 9A-9D show an example of the operation of the second embodiment described above. If disturbance wave as indicated in the figure, exists in the lower band of the received signal lower side band in FIG. 9F, the signal shown in FIG. 9B after having passed through the filter 31 and the upper side band signal shown in FIG. 9C after having passed through the filter 32, which are detected and compared in level. The selecting switch 40 selects the channel (B) according to the information thus obtained. In this way, a signal is obtained at the output properly centered on to, which contains no disturbance wave as indicated in FIG. 9D.

Figure 10:
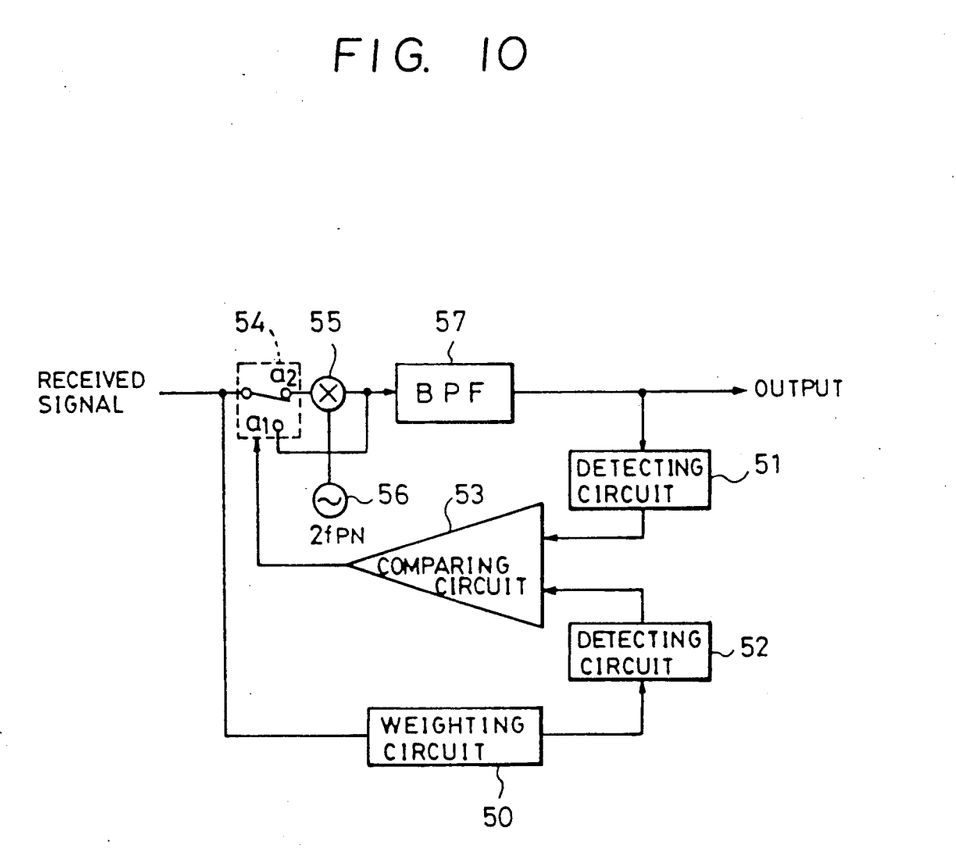
FIG. 10 is a block diagram showing a third embodiment of the present invention.

Next FIG. 10 shows a third embodiment of the SSC receiving device according to the present invention.

In the figure, 50 is a weighting circuit; 51 and 52 are detecting circuits; 53 is a comparing circuit; 54 is a selecting switch; 55 is a multiplier; 56 is a PN clock oscillator; and 57 is a band limiting filter.

In the embodiment described above, weighting (here e.g. $\frac{1}{2}$ of the total level) is effected previously by means of the weighting circuit 50 so that the signal levels of the outputs of the detecting circuits 51 and 52 are equal to each other in the state where there is no disturbance wave (FIG. 11 (A)). The band of the filter 57 is limited so that only the high side band B of the received signal indicated in FIG. 5B is allowed to pass through (see FIG. 11B). Now, if a disturbance wave is mixed, a level difference is produced in the outputs of the detecting circuits 51 and 52 and the output state of the comparing circuit 53 is changed. The selecting switch 54 selects one of terminals $a_1$ and $a_2$ on the basis of the output of the comparing circuit. When $a_1$ is selected, no frequency shift is effected. On the contrary, when $a_2$ is selected, a shift is effected, which is equal to a frequency 2fPN, which is twice as high as the PN clock.

Figure 11A:
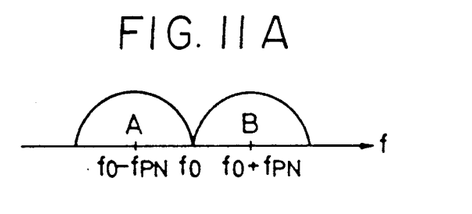
FIGS. 11A-11H show the signal spectrum at various points in the circuit of FIG. 10.
Figure 11B:
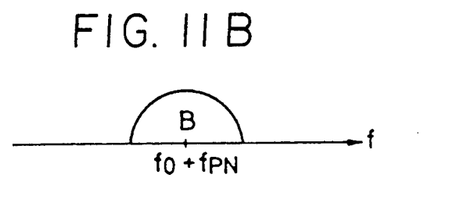
Figure 11C:
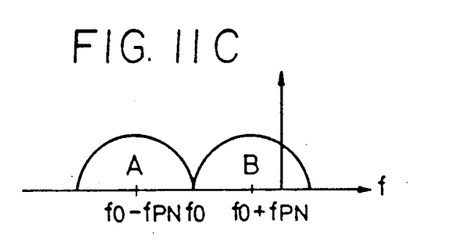
Figure 11D:
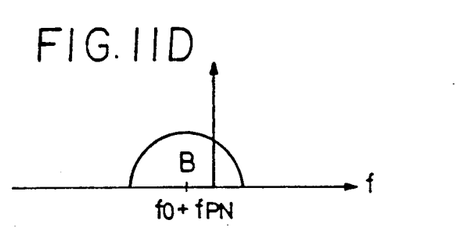
Figure 11E:
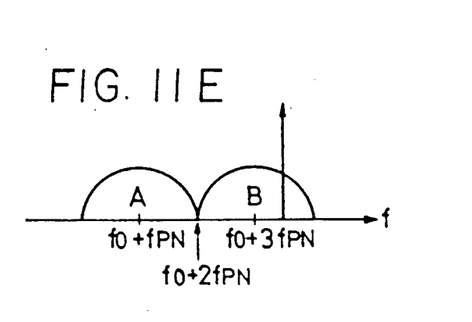
Figure 11F:
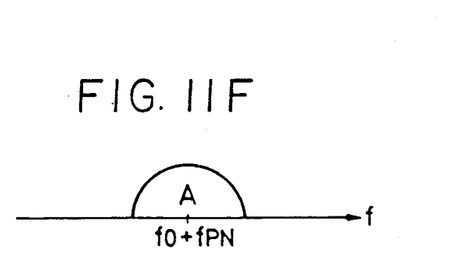
Figure 11G:
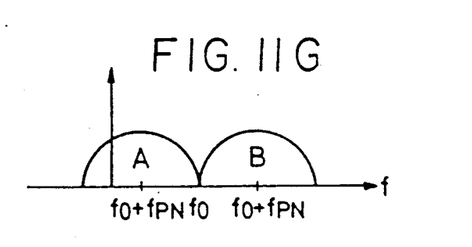
Figure 11H:
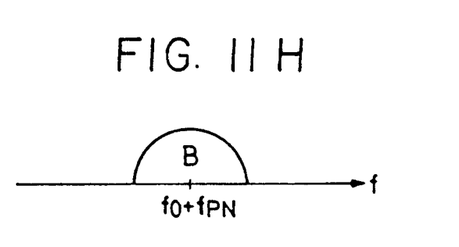

FIGS. 11C-11H show examples of the operation of the embodiment described above. When the disturbance wave is mixed in B indicated in FIG. 11C, at the output of the weighting circuit 50 in FIG. 10 both the disturbance wave and the information signal are reduced to $\frac{1}{2}$ in the level by the weighting, On the contrary, at the output of the filter 57 the signal and the disturbance wave remain at their initial levels (FIG. 11D). When they are detected and compared the level, the output of detecting circuit 52 is less than that of 51 The selecting switch 24 selects terminal $a_2$ according to the information of this comparison. In this way, a frequency shift is effected as indicated in FIG. 11 (E) and thus a signal containing no disturbance wave is obtained after the passage through the filter 57 (FIG. 11F). On the other hand, when disturbance wave is mixed in A indicated in FIG. 11G, at the output of the weighting circuit 50 in FIG. 10 both the disturbance wave and the information signal are reduced to $\frac{1}{2}$ in the level. On the contrary, at the output of the filter 57 there is no disturbance wave and the signal remains at its initial value. When they are detected and compared in level, the output of detecting circuit 52 is greater than that of 51. At this time, the comparing circuit 53 at on the selecting switch 54 to hold it at its initial state (selection of (terminal Q)).

Owing to such a construction a signal containing no disturbance wave can be obtained at the output.

Figure 12:
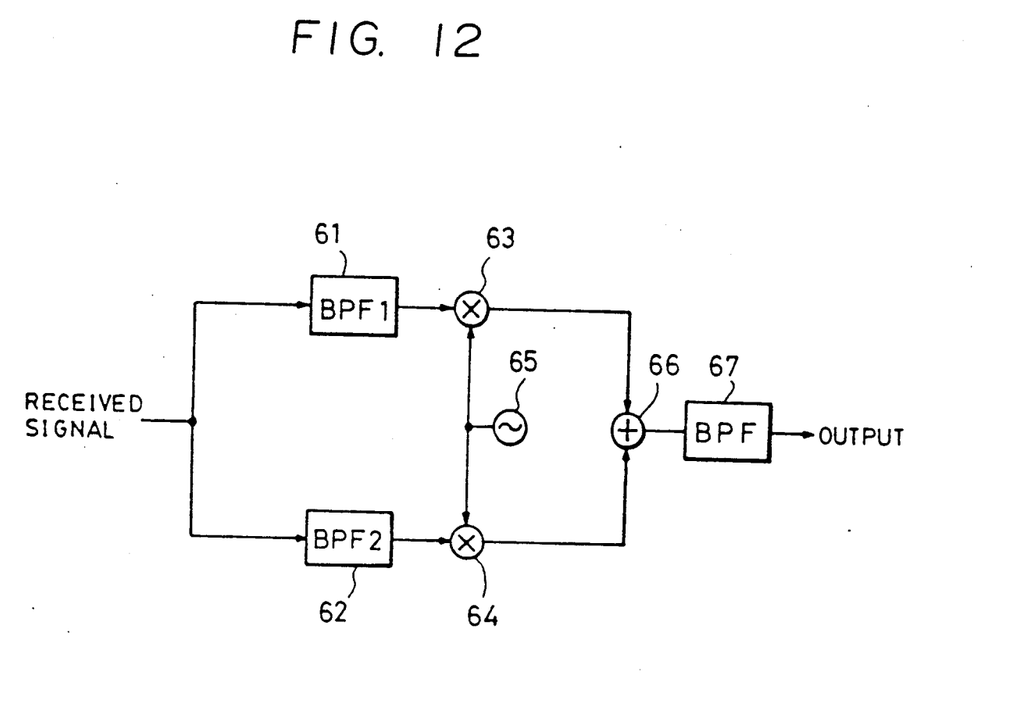
FIG. 12 is a block diagram showing a fourth embodiment of the present invention.

Next FIG. 12 shows a fourth embodiment of the SSC receiving device according to the present invention.

In the figure, 61 and 62 are band limiting filters; 63 and 64 are multipliers; 65 is a PN clock oscillator; 66 is an adder; and 67 is a band limiting filter.

By this construction the received signal is divided into two channels by the band limiting filter 61, which makes A in FIG. 5B pass through, and the band limiting filter 62, which makes B pass through. A frequency shift is effected by multiplying the respective filter outputs by the PN clock 65, which the receiving side has, by the multipliers 63 and 64, respectively, so that the signals of both the channels have a same central frequency, to synthesize them.

Figure 13A:
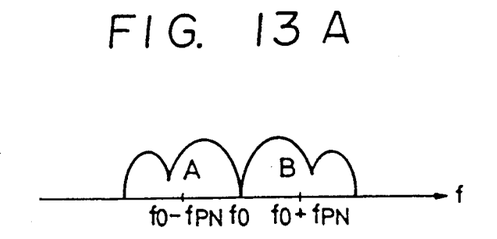
FIGS. 13A-13C show the signal spectrum at various points in the circuit of FIG. 12.
Figure 13B:
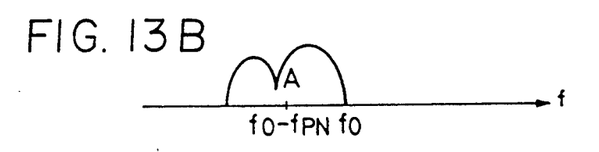
Figure 13C:
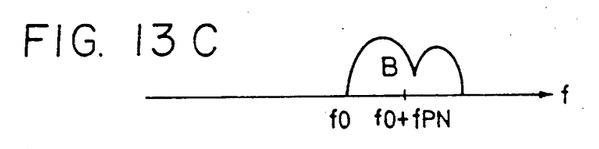
Figure 13D:
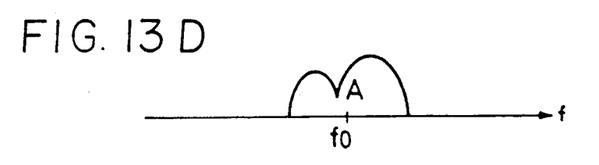
Figure 13E:
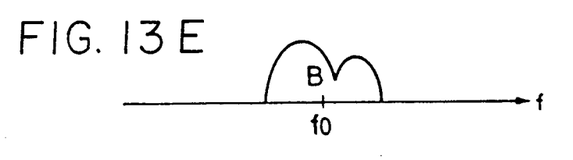
Figure 13F:
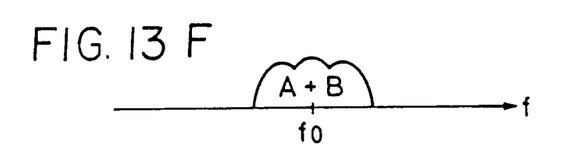

FIGS. 13A-13F show an example of the operation of the embodiment described above. The reference numerals in the figure correspond to those indicated in FIG. 12. In the case where selective fading is present in the received signal (FIG. 13A), this received signal is separated, by means of the filters 61 and 62 (FIGS. 13B, 13C) and shifted in frequency (FIGS. 13D, 13E) so that the signals of both the channels have a same frequency. The output signal FIG. 13F is obtained by adding these two channels by means of the adder 36 and then pass them through the filter 67, and an output in which the selective fading is reduce is obtained.

Although, in the second to fourth embodiments, the transmitting device is constructed as indicated in FIG. 5A, it is a matter of course that it is not restricted thereto.

As explained above, according to the present inventions, in the SSC, it is possible to obtain a good received signal, even if disturbance wave is mixed and further to simplify the receiving device by Manchester-coding the PN code.

While particular embodiments of the invention have been shown and described, it will be obvious to those skilled in the art that various changes and modifications may be made without departing from the present invention in its broader aspect.

What is claimed is:

1. A spread spectrum signal processing circuit for processing a received modulated carrier signal from a transmitter carrying information, and whose spectrum has been spread at said transmitter by PN code modulation into a high band spectrum above the center frequency of said carrier and a low band spectrum below said center frequency, said circuit comprising:
  filter means for separating said received signal into a high channel containing at least a major portion of said high band spectrum and a low channel containing at least a major portion of said low band spectrum;
  comparator means for producing a control signal condition indicative of the relative signal levels of said two channels; and
  switching means responsive to said comparator means for selectively outputting a selected one of said channels according to the whether channel having the weaker or stronger level is desired.

2. The signal processing circuit of claim 1 wherein said comparator means includes means for actuating said switching means to output the channel having the weaker signal level therein.

3. A spread spectrum signal processing circuit for processing a received modulated carrier signal from a transmitter carrying information, and whose spectrum has been spread at said transmitter by using a PN code into a high band spectrum above the center frequency of said carrier and a low band spectrum below said center frequency, said circuit comprising:
  filter means for separating said received signal into a high channel containing at least a major portion of said high band spectrum and a low channel containing at least a major portion of said low band spectrum;
  comparator means including a pair of detector circuits for detecting the respective outputs of said filter means, a pair of integrator circuits for integrating the respective outputs of said detector circuits, and a comparator for comparing the outputs of said integrator circuits to provide a control signal condition indicative of the relative signal power in said channels; and
  switching means responsive to said control signal condition for selectively outputting a selected one of said channels according to the whether the channel containing the weaker or stronger signal power is desired.

4. The signal processing circuit of claim 3 wherein said comparator means includes means for actuating said switching means to output the channel having the weaker signal power therein.

5. A spread spectrum signal processing circuit for processing a received modulated carrier signal from a transmitter carrying information, and whose spectrum has been spread at said transmitter by PN code modulation into a high band spectrum above the center frequency of said carrier and a low band spectrum below said center frequency, said PN code being a Manchester-coded PN code generated responsively to signals from a clock of given frequency at said transmitter, said circuit comprising:
  filter means for separating said received signal into a high channel containing at least a major portion of said high band spectrum and a low channel containing at least a major portion of said low band spectrum;
  comparator means for producing a control signal condition indicative of the relative signal levels of said two channels; frequency converting means for shifting the center frequency of said portions of said high and low band spectrums passed by said filter means to a common center frequency; and
  switching means responsive to said control signal condition for selectively outputting a selected one of said frequency-shifted portions according to the whether the channel having the weaker or stronger signal level is desired.

6. The signal processing circuit of claim 5 wherein said frequency shifting means includes generating means for generating pulses at a rate generally equal to that of said clock, and multiplying means for multiplying the outputs of each of said filter means by said pulses so as to make said common center frequency generally coincide with said center frequency of said carrier.

7. The signal processing circuit of claim 6 wherein said comparator means includes means for actuating said switching means to output the channel having the weaker signal level therein.

8. The signal processing circuit of claim 5 wherein said comparator means includes means for actuating said switching means to output the channel having the weaker signal level therein.

9. The signal processing circuit of claim 5 wherein said comparator means includes detector circuits for detecting the outputs of said filter means, and a comparator for comparing the outputs of said detector circuits to provide said control signal condition.

10. A spread spectrum signal processing circuit for processing a received modulated carrier signal from a transmitter carrying information, and whose spectrum has been spread at said transmitter by PN code modulation into a high band spectrum above the center frequency of said carrier and a low band spectrum below said center frequency, said PN code being a Manchester-coded PN code generated responsively to signals from a clock of given frequency, said circuit comprising:
  weighting means for providing a replica of said received signal at predetermined level;
  frequency converting means for providing a replica of said received signal at a predetermined frequency;
  switch means operatively responsive to a control signal condition for selecting one of said received signal and said frequency-shifted signal;
  filter means for extracting a signal of a predetermined band width from the signal selected by said switch; and
  comparator means for comparing the level of said weighted signal and the level of the output signal of said filter means and including means for providing said control signal condition to actuate said switching means to select a desired one of said received signal and said frequency-shifted signal.

11. The signal processing circuit of claim 10 wherein the passband of said filter means is generally centered on one of said high band spectrum and said low band spectrum, said frequency converting means including generating means for generating pulses at a rate generally equal to twice that of said clock and means responsive to said pulses for providing said replica so that the center frequency of the replica of the other of said high band spectrum and said low band spectrum is generally centered on the passband of said filter means, and said weighting means includes means for providing said replica of said received signal at a level approximately equal to the level produced by said filter means when filtering a received signal having approximately equal signal levels in said high and low band spectra.

12. The signal processing circuit of claim 11 including means for selectively actuating said switch means so that said filter means outputs a replica of the weaker of said band spectra when there is an imbalance therebetween.

13. The signal processing circuit of claim 10 including means for selectively actuating said switch means so that said filter means outputs a replica of the weaker of said band spectra when there is an imbalance therebetween.

14. A spread spectrum signal processing circuit for processing a received modulated carrier signal from a transmitter carrying information, and whose spectrum has been spread at said transmitter by PN code modulation into a high band spectrum above the center frequency of said carrier and a low band spectrum below said center frequency, said PN code being a Manchester-coded PN code generated responsively to signals from a clock of given frequency, said circuit comprising:

filter means for separating said received signal into a high channel containing at least a major portion of said high band spectrum and a low channel containing at least a major portion of said low band spectrum;

frequency converting means for shifting said separated signals into respective predetermined bands; and adder means for adding said shifted signals.

15. The signal processing circuit of claim 14 wherein said frequency converting means includes means for establishing said bands centered on said center frequency.

16. The signal processing circuit of claim 15 wherein said means for establishing said bands centered on said center frequency includes generating means for generating pulses at a rate generally equal to that of said clock, and multiplying means for multiplying the outputs of each of said filter means by said pulses.

* * * * *